(12) United States Patent
Wu et al.

(10) Patent No.: US 8,989,707 B2
(45) Date of Patent: *Mar. 24, 2015

(54) SYSTEM AND METHOD FOR PROVISIONING A WIRELESS DEVICE TO ONLY BE ABLE TO ACCESS NETWORK SERVICES WITHIN A SPECIFIC LOCATION

(71) Applicant: Novatel Wireless, Inc., San Diego, CA (US)

(72) Inventors: John Jun Wu, San Diego, CA (US); Kwun Ho, San Diego, CA (US)

(73) Assignee: Novatel Wireless, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/846,739

(22) Filed: Mar. 18, 2013

(65) Prior Publication Data

US 2014/0120873 A1 May 1, 2014

Related U.S. Application Data

(63) Continuation of application No. 13/303,067, filed on Nov. 22, 2011, now Pat. No. 8,401,519, which is a continuation of application No. 11/250,679, filed on Oct. 14, 2005, now Pat. No. 8,064,884.

(60) Provisional application No. 60/618,972, filed on Oct. 14, 2004.

(51) Int. Cl.
| | |
|---|---|
| H04M 1/66 | (2006.01) |
| H04M 1/68 | (2006.01) |
| H04M 3/16 | (2006.01) |
| H04M 3/00 | (2006.01) |
| H04W 4/00 | (2009.01) |

(Continued)

(52) U.S. Cl.
CPC ............... *H04W 48/04* (2013.01); *H04L 63/10* (2013.01); *H04L 63/107* (2013.01); *H04W 12/08* (2013.01); *H04L 67/303* (2013.01); *H04L 67/18* (2013.01); *H04W 8/18* (2013.01); *H04W 12/02* (2013.01); *H04W 76/02* (2013.01); *H04W 84/14* (2013.01); *H04W 88/021* (2013.01); *H04W 88/08* (2013.01); *H04W 88/16* (2013.01)
USPC .......................... 455/411; 455/422.1; 455/419

(58) Field of Classification Search
CPC ..... H04W 24/00; H04W 24/02; H04W 24/04; H04W 48/02; H04W 48/10; H04W 48/12; H04W 12/00; H04W 12/08; H04W 88/00; H04W 88/16
See application file for complete search history.

(56) References Cited

U.S. PATENT DOCUMENTS

| | | | |
|---|---|---|---|
| 6,175,733 B1 * | 1/2001 | Seekins et al. | ................. 455/434 |
| 6,259,908 B1 | 7/2001 | Austin | |

(Continued)

OTHER PUBLICATIONS

International Search Report for PCT Application PCT/US05/37027.
Communication pursuant to Article 94(3) EPC in EP Application No. 05 810 198.1, dated Sep. 13, 2012.

*Primary Examiner* — Marisol Figueroa
(74) *Attorney, Agent, or Firm* — TechLaw LLP

(57) ABSTRACT

A system and method for provisioning wireless devices such that they are only capable of accessing network services when in a specified location. A device surveys the current location of the device for existing base stations and stores a corresponding network environment profile. After the profile is stored, network services will only be provided to the device if the current network profile matches the stored profile.

18 Claims, 3 Drawing Sheets

(51) Int. Cl.
*H04W 48/04* (2009.01)
*H04L 29/06* (2006.01)
*H04W 12/08* (2009.01)
*H04L 29/08* (2006.01)
*H04W 8/18* (2009.01)
*H04W 12/02* (2009.01)
*H04W 76/02* (2009.01)
*H04W 84/14* (2009.01)
*H04W 88/02* (2009.01)
*H04W 88/08* (2009.01)
*H04W 88/16* (2009.01)

(56) References Cited

U.S. PATENT DOCUMENTS

| | | | |
|---|---|---|---|
| 6,414,635 | B1 | 7/2002 | Stewart |
| 7,620,016 | B2 | 11/2009 | Sayers |
| 8,064,884 | B2 | 11/2011 | Wu et al. |
| 8,401,519 | B2 * | 3/2013 | Wu et al. .............. 455/410 |
| 2001/0018326 | A1 | 8/2001 | Link |
| 2002/0065099 | A1 | 5/2002 | Bjorndahl |
| 2003/0123669 | A1 | 7/2003 | Koukoulidis |
| 2004/0106396 | A1 | 6/2004 | Segura |

* cited by examiner

SYSTEM AND METHOD FOR PROVISIONING A WIRELESS DEVICE TO ONLY BE ABLE TO ACCESS NETWORK SERVICES WITHIN A SPECIFIC LOCATION

CROSS-REFERENCE TO RELATED PATENT APPLICATIONS

This application is a Continuation of U.S. patent application Ser. No. 13/303,067, filed Nov. 22, 2011, which in turn, is a Continuation of U.S. patent application Ser. No. 11/250,679, filed Oct. 14, 2005, which in turn, claims priority to Provisional Patent Application No. 60/618,972, filed Oct. 14, 2004, all of which are incorporated herein by reference in their entirety.

FIELD OF THE INVENTION

The present invention relates generally to the accessing of network services by wireless electronic devices. More particularly, the present invention relates to the provisioning of wireless devices to regulate access to network services.

BACKGROUND OF THE INVENTION

Traditional wireless communication devices are typically in the form of mobile devices. Such mobile devices are configured to search for and communicate with a wireless communication network nearest the current location of the device. As the device moves from one location to another, it is handed off from one cell site within the network to another in order to provide continuous service to the device as it moves out of range of one site and into range of another site. Wireless operators desire to provide fixed wireless data and voice services to consumers. In order to do this cost effectively, the devices must only be allow to operate in a fixed location. The problem is how to cost effectively fix the service location of the devices.

Fixed wireless is an emerging wireless communication system in which subscribers are provided with wireless communication as their primary communication means in a residence, business, or other defined location. Fixed wireless can be particularly useful in areas where wire services are not available, inadequate or cost prohibitive. In a fixed wireless system, a subscriber's wireless device is typically assigned to a geographically defined fixed location or "home zone."

Although wireless operators desire to provide fixed wireless data and voice services to consumers, it must be possible for the devices to be permitted to operate only in the defined fixed location or home zone in order for such a system to be implemented in a cost effective manner.

SUMMARY OF THE INVENTION

The present invention comprises a system and method for provisioning wireless devices such that they are only capable of accessing network services when in a specified location. According to one embodiment of the present invention, a device surveys the current location of the device for existing base stations and stores a corresponding network environment profile. Once the profile is stored, network service will only be provided to the device if the current network profile matches the stored profile. In such a system, the distribution logistics can be greatly simplified, resulting in substantial cost savings to the wireless carrier.

These and other objects, advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

The present invention provides a system and method for addressing how to permit an electronic device to access network services only when it is within a particular geographical area.

Figure 1:
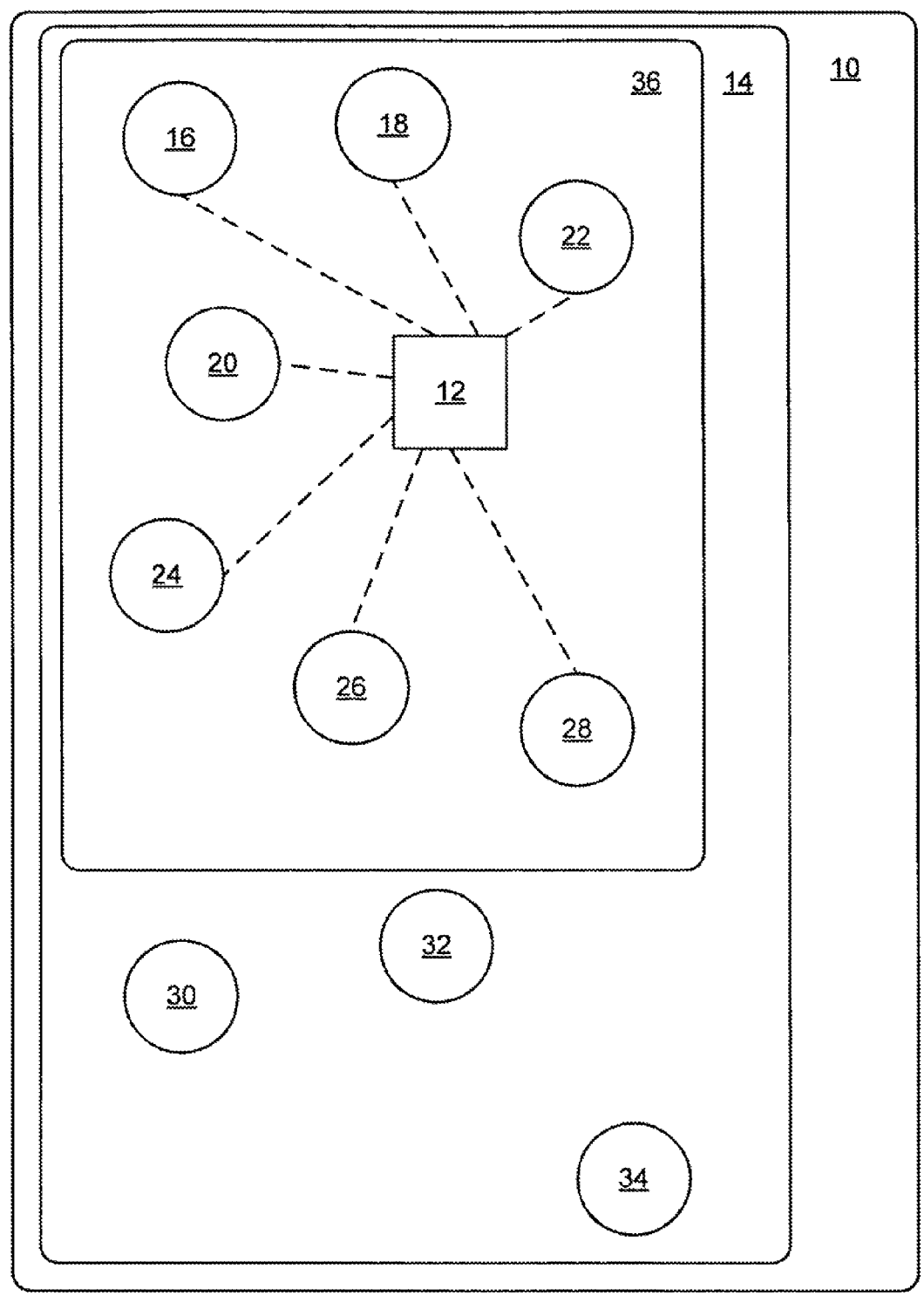
FIG. 1 is a system constructed in accordance with one embodiment of the present invention.

FIG. 1 shows a system 10 constructed in accordance with one embodiment of the present invention. The system 10 comprises a wireless device 12 and a network 14. The network 14 includes a plurality of network elements 16, 18, 20, 22, 24, 26, 28, 30, 32, and 34. These various network elements can comprises items such as cell sites, etc. Each network element 16-34 can be uniquely identified based upon information unique to the cell site, such as, for example, the Cell ID# and LAC, the cell scrambling code, the frequency band of operation of the cell, etc. Some of the network elements 16-28 can be positioned in a geographic home zone 36 of the mobile device 12, while other of the network elements 30, 32 and 34 can be positioned outside the home zone 36.

According to one embodiment of the invention, the device 12 is permitted to only communicate with the network elements 16-28 in its home zone 36. Conversely, the device 12 is denied permission to access the network 14 via the network elements 30, 32 and 34 outside of its home zone 36.

Figure 2:
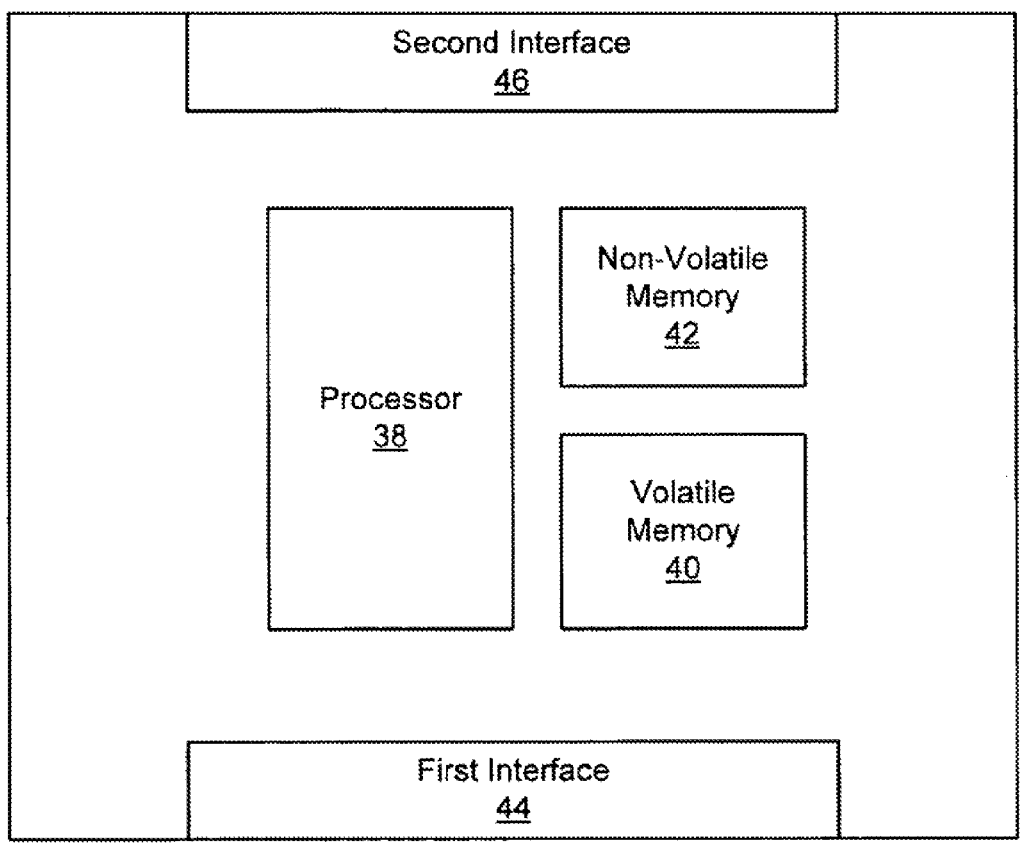
FIG. 2 is an illustration of one embodiment of a device constructed according to the principles of present invention.

FIG. 2 illustrates one embodiment of a device 12 according to the present invention. The device 12 can include a processor 38, volatile memory 40, non-volatile memory 42, and first and second communications interfaces 44 and 46. In one embodiment, the first communication interface 44 can be configured to provide WLAN communications services. The second communication interface 46 can be configured to communicate with a UMTS communication network. The processor 38 can be configured to control operation of the first and second communication interfaces 44 and 46, as well as the volatile memory 40 and the non-volatile memory 42.

The device 12 can be configured to establish a connection with a network element in order to receive various communications services from the network 14. Various different permissioning schemes can be used based on whether the device 12 is inside or outside its home zone 36. For example, the device 12 can be allowed to connect to a cell site outside its home zone 36, but be denied data services.

The present invention involves dynamically fixing the service location for the device 12. By dynamically fixing the location of the device 12, the distribution logistics can be greatly simplified, ultimately providing significant cost savings to the wireless carrier.

One embodiment of the present invention involves the use of an algorithm in the device 12 that can survey the current location of the device 12 for existing base stations and/or other network elements and store the network environment profile. Once the profile is stored, service can only be provided if the current network profile matches the stored profile. This algorithm can be initiated locally or remotely. Remote initiation can be triggered by an encrypted short message service (SMS) message to the device. Encryption keys can be specific to the device to prevent tampering.

In one embodiment of the present invention, the device 12 comprises a fixed wireless residential gateway device, which serves as a gateway between one or more local area networks and a larger wide area network. One such gateway device is described in detail in U.S. Provisional Patent Application No. 60/618,972, filed Oct. 14, 2004 and U.S. patent application Ser. No. 11/250,679, both entitled "System and Method for Provisioning a Wireless Device to Only Be Able to Access Network Services Within a Specific Location" and incorporated by reference herein in their entirety.

As discussed previously, carriers can use one embodiment of the present invention to limit service to wireless devices such that the device can only access the services in certain locations. Such systems can be configured to dynamically fix a serviceable location for a wireless device by surveying the wireless network and storing the network information. This information can then be used by comparing the information to the current network information. Embodiments of the invention can be configured to allow services to be accessed only if the current network information matches with the stored information. Otherwise, if no match is found, various services can be blocked.

Figure 3:
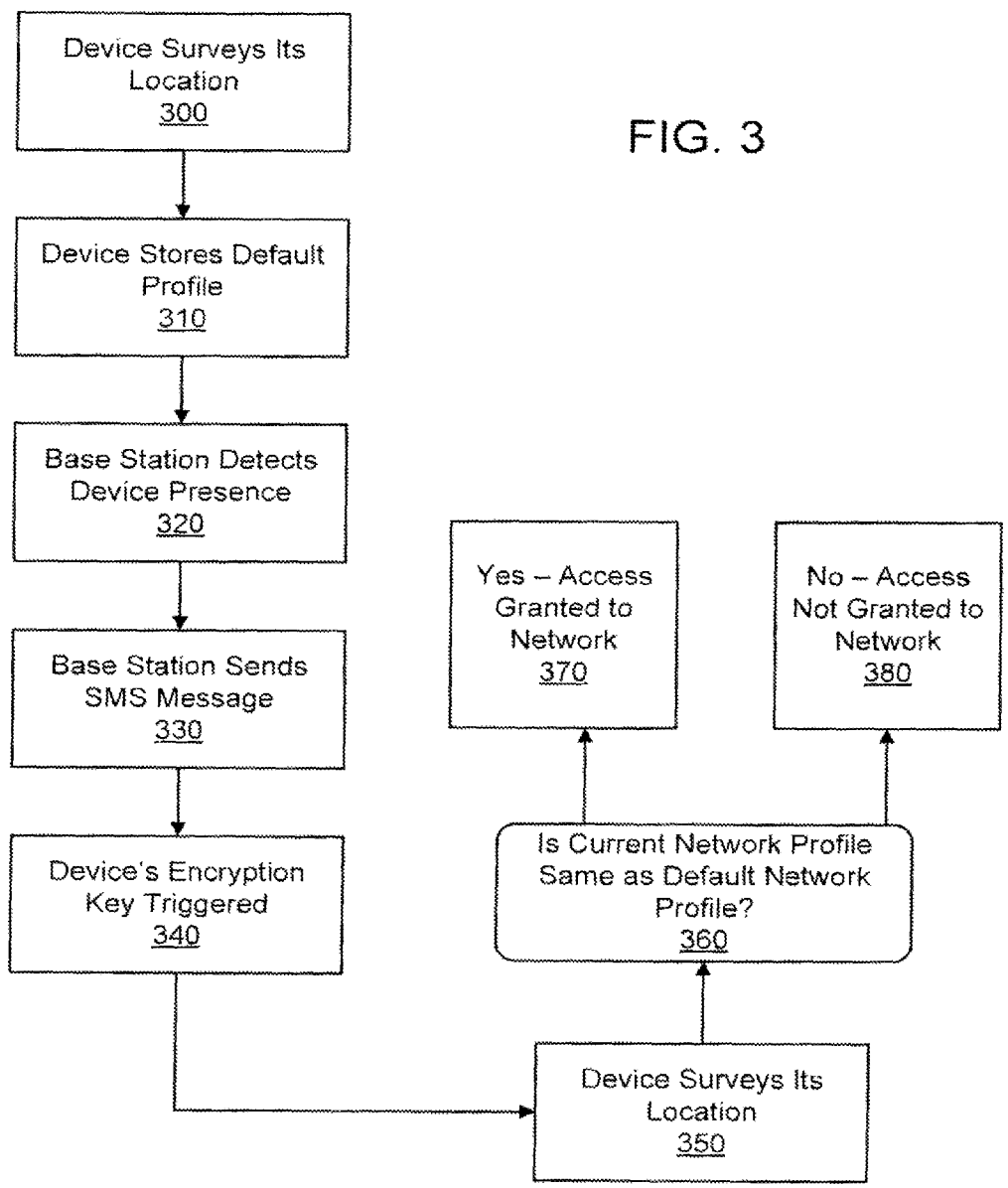
FIG. 3 is a flow chart showing the implementation of one embodiment of the present invention.

FIG. 3 is a flow chart showing the implementation of one embodiment of the present invention. At step 300, during the initial setup phase for an electronic device, the electronic device surveys the location of the device for existing base stations. At step 310, the electronic device stores a network environment profile. This profile is considered to be the "default" profile. At some later time, the device is activated (if necessary) and enters the same communication area as a particular base station at step 320. Upon noting the presence of the electronic device, the base station transmits an encrypted SMS message to the electronic device at step 330. The encrypted SMS message, when received by the electronic device and matched with the electronic device's encryption key, triggers the configuration process at step 340. At step 350, the electronic device surveys the network environment at that particular moment, noting the base stations that are within range of the electronic device. At step 360, it is then determined if the current network environment matches the default network environment. In the event that the current network environment matches the default network environment, then the electronic device is permitted to access the services of the base station at step 370. On the other hand, if the current network environment does not match the default network environment, then service is denied at step 380.

In other embodiments of the invention, instead of accepting or denying access to all services for the network, access to the network can be more selective. For example, in one embodiment of the invention, a lack of a match between the current network profile and the default profile could result in only limited, low-level access to the network. Similarly, the granting and denying of access rights can be tailored to certain bit rates. For example, higher bit transfer rates can be granted only to those devices who are identified as being their "correct" zone of use. Other variations and embodiments of the present invention can also be implemented.

Although the process depicted in FIG. 4 involves the use of SMS messages, the configuration steps for the implementation of the present invention can be triggered in a number of ways. For example, in embodiments of the invention using Code Division Multiple Access (CDMA) and Evolution Data Only (EVDO) wireless standards, a combination of system IDs, network IDs, and signal strength may also be used to trigger the configuration process. GUI can also be used to initiate the algorithm of the present invention.

The present invention is described in the general context of method steps, which may be implemented in one embodiment by a program product including computer-executable instructions, such as program code, executed by computers in networked environments.

Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule-based logic and other logic to accomplish the various database searching steps, correlation steps, comparison steps and decision steps. It should also be noted that the words "component" and "module" as used herein, and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method of dynamically fixing a service location of an electronic device, comprising:
    detecting, at a network device, the presence of the electronic device within a current network environment;
    transmitting signal information to the electronic device to trigger a configuration process within the electronic device for creating a current network environment profile based on the current network environment; wherein
    the electronic device is provided with access to network services if the configuration process determines that the current network environment profile matches a predetermined network environment profile created during an initial setup phase of the electronic device and stored within the electronic device; and
    the electronic device is either denied or provided with selective access to the network services if the configuration process determines that the current network environment profile does not match the predetermined network environment profile.

2. The method of claim 1, wherein the network device comprises a base station.

3. The method of claim 1, wherein the signal information comprises one of an encrypted short message service (SMS) message or a globally unique identifier (GUI).

4. The method of claim 3, wherein the encrypted SMS message includes an encryption key.

5. The method of claim 1, wherein the electronic device comprises a residential gateway device.

6. The method of claim 1, wherein the selective access to the network services provided to the electronic device comprises access to the network services provided at a lower bit rate than a higher bit rate that would be provided if the configuration process determined that the current network environment profile matched the predetermined network environment profile created during the initial setup phase.

7. A network device to dynamically fix a service location of an electronic device, the network device comprising:
   a processor; and
   a memory unit operatively connected to the processor and including computer code for causing the processor to:
      detect the presence of the electronic device within a current network environment; and
      transmit signal information to the electronic device to trigger a configuration process within the electronic device for creating a current network environment profile based on the current network environment; wherein
   the electronic device is provided with access to network services if the configuration process determines that the current network environment profile matches a predetermined network environment profile created during an initial setup phase of the electronic device and stored within the electronic device; and
   the electronic device is either denied or provided with selective access to the network services if the configuration process determines that the current network environment profile does not match the predetermined network environment profile.

8. The network device of claim 7, wherein the network device comprise a base station.

9. The network device of claim 7, wherein the signal information comprises one of an encrypted short message service (SMS) message or a globally unique identifier (GUI).

10. The network device of claim 9, wherein the encrypted SMS message includes an encryption key.

11. The network device of claim 7, wherein the electronic device comprises a residential gateway device.

12. The network device of claim 7, wherein the selective access to the network services provided to the electronic device comprises access to the network services provided at a lower bit rate than a higher bit rate that would be provided if the configuration process determined that the current network environment profile matched the predetermined network environment profile created during the initial setup phase.

13. A computer program product, embodied on a non-transitory computer readable medium, for dynamically fixing a service location of an electronic device, the computer program product comprising:
   computer code for detecting, at a network device, the presence of the electronic device within a current network environment; and
   computer code for transmitting signal information to the electronic device to trigger a configuration process within the electronic device for creating a current network environment profile based on the current network environment; wherein
   the electronic device is provided with access to network services if the configuration process determines that the current network environment profile matches a predetermined network environment profile created during an initial setup phase of the electronic device and stored within the electronic device; and
   the electronic device is either denied or provided with selective access to the network services if the configuration process determines that the current network environment profile does not match the predetermined network environment profile.

14. The computer program product of claim 13, wherein the network device comprise a base station.

15. The computer program product of claim 13, wherein the signal information comprises one of an encrypted short message service (SMS) message or a globally unique identifier (GUI).

16. The computer program product of claim 15, wherein the encrypted SMS message includes an encryption key.

17. The computer program product of claim 13, wherein the electronic device comprises a residential gateway device.

18. The network device of claim 13, wherein the selective access to the network services provided to the electronic device comprises access to the network services provided at a lower bit rate than a higher bit rate that would be provided if the configuration process determined that the current network environment profile matched the predetermined network environment profile created during the initial setup phase.

* * * * *